United States Patent
Yoon et al.

(10) Patent No.: US 8,791,960 B2
(45) Date of Patent: Jul. 29, 2014

(54) MARKERLESS AUGMENTED REALITY SYSTEM AND METHOD USING PROJECTIVE INVARIANT

(75) Inventors: Suk June Yoon, Seoul (KR); Kyung Shik Roh, Seongnam-si (KR); Seung Yong Hyung, Yongin-si (KR); Sung Hwa Ahn, Angyang-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 886 days.

(21) Appl. No.: 12/905,649

(22) Filed: Oct. 15, 2010

(65) Prior Publication Data

US 2011/0090252 A1 Apr. 21, 2011

(30) Foreign Application Priority Data

Oct. 20, 2009 (KR) .................. 10-2009-0099860

(51) Int. Cl.
*G09G 5/00* (2006.01)

(52) U.S. Cl.
USPC .......................... 345/633; 345/628

(58) Field of Classification Search
CPC .................................................... G06T 19/006
USPC ............................ 345/632–633, 628
See application file for complete search history.

(56) References Cited

U.S. PATENT DOCUMENTS

2011/0080336 A1* 4/2011 Leyvand et al. .............. 345/156

OTHER PUBLICATIONS

Skrypnyk et al.; "Scene modeling, recognition and tracking with invariant image features;" Proc. the 3rd IEEE/ACM International Symposium on Mixed and Augmented Reality (ISMAR04) ; pp. 110-119 (pp. 1-10 in pdf); 2004.*
Loaiza et al.; "A novel optical tracking algorithm for point-based projective invariant marker partterns;" In ISVC (1); pp. 160-169; 2007.*
Guan et al.; "Registration Based on Online Estimation of Trifocal Tensors Using Point and Line Correspondences;" Virtual Reality Lecture Notes in Computer Science vol. 4563, pp. 42-51; 2007.*
Simon et al.; "Markerless Tracking using planar structures in the scene;" ISAR 2000; Proceedings. IEEE and ACM International Symposium on Augmented Reality, pp. 120-128 (1-9 in pdf) 2000.*

* cited by examiner

*Primary Examiner* — Said Broome
*Assistant Examiner* — Peter Hoang
(74) *Attorney, Agent, or Firm* — Staas & Halsey LLP

(57) ABSTRACT

Disclosed herein are a markerless augmented reality system and method for extracting feature points within an image and providing augmented reality using a projective invariant of the feature points. The feature points are tracked in two images photographed while varying the position of an image unit, a set of feature points satisfying a plane projective invariant is obtained from the feature points, and augmented reality is provided based on the set of feature points. Accordingly, since the set of feature points satisfies the plane projective invariant even when the image unit is moved and functions as a marker, a separate marker is unnecessary. In addition, since augmented reality is provided based on the set of feature points, a total computation amount is decreased and augmented reality is more efficiently provided.

15 Claims, 8 Drawing Sheets

MARKERLESS AUGMENTED REALITY SYSTEM AND METHOD USING PROJECTIVE INVARIANT

CROSS-REFERENCE TO RELATED APPLICATIONS

This application claims the priority benefit of Korean Patent Application No. 2009-0099860, filed on Oct. 20, 2009 in the Korean Intellectual Property Office, the disclosure of which is incorporated herein by reference.

BACKGROUND

1. Field

Embodiments discussed herein relate to a markerless augmented reality system and method for extracting feature points within an image and providing augmented reality using a projective invariant of the feature points.

2. Description of the Related Art

Augmented Reality (AR) refers to a technology of inserting a virtual graphic (object) into an actual image acquired by a camera and generating an image in which a real object and a virtual object are mixed. AR is characterized in that supplementary information using a virtual graphic may be provided onto an image acquired in the real world. Such AR is used in fields such as educational materials, road guidance or games and also is used as a user interface. In order to provide natural AR, three-dimensional positional information of a camera to acquire an image is rapidly and accurately detected. To this end, marker-based augmented reality using a square marker with a high contrast ratio has come into wide use. In this case, four corner points of a square are detected using the square marker and three-dimensional camera information is computed using this information. The AR using the marker which is easily detected is advantageous in that recognition and tracking are relatively accurately performed in real time. However, actual sensation is decreased due to the use of the artificial marker and heterogeneous sensation is given to a user.

For this reason, recently, research into AR using a general natural image instead of the artificial marker is ongoing. In general, markerless AR uses a feature point matching method. Feature point matching refers to an operation for searching for and connecting the same feature points in two difference images. A method for extracting a plane using a Simultaneous Localization and Map-building (SLAM)/Parallel Tracking And Mapping (PTAM) algorithm for tracking three-dimensional positional information of a camera and three-dimensional positional information of feature points in real time and providing AR using the plane has been suggested. However, since the SLAM/PTAM algorithm acquires the image so as to search for the feature points, computes the three-dimensional position of the camera and the three-dimensional positions of the feature points, and provides AR based on such information, a considerable computation is necessary.

SUMMARY

Additional aspects of the invention will be set forth in part in the description which follows and, in part, will be obvious from the description, or may be learned by practice of the invention.

Therefore, it is an aspect to provide a system and method for providing markerless augmented reality using a projective invariant with minimal computation.

In accordance with one aspect, there is provided a markerless augmented reality system receiving an image from a camera, the markerless augmented reality system including: an image processing unit to separate the image acquired by camera and to extract feature points; a plane extraction unit to extract a plane using a plane projective invariant of the feature points; and an augmented reality provision unit to provide augmented reality based on the extracted plane.

The camera may be a single camera to acquire image information of an object at different positions.

The image processing unit may equally separate an initial image $I_t$ acquired at a position before the camera is moved and extract the feature points.

The image processing unit may further include a feature tracking unit to track the extracted feature points in a next image $I_{t+1}$ acquired at a position to which the camera is moved.

The plane extraction unit may obtain a set of feature points satisfying the plane projective invariant from the tracked feature points and extract the plane.

The set of feature points may be obtained by generating a set of feature points in descending order of index values thereof and computing the plane projective invariant.

The augmented reality provision unit may provide the augmented reality based on the set of feature points satisfying the plane projective invariant.

In accordance with another, there is provided a markerless augmented reality system receiving image from a camera using a projective invariant, the markerless augmented reality system including: an image processing unit to extract and track feature points from the plurality of images acquired by the camera; a plane extraction unit to obtain a set of feature points satisfying a plane projective invariant from the tracked feature points and to extract a plane; and an augmented reality provision unit to provide augmented reality based on the set of feature points satisfying the plane projective invariant.

An aspect of embodiment, a storage unit may to store a plurality of images received from the camera.

The plurality of images may include an initial image $I_t$ acquired at a position before the camera is moved and a next image $I_{t+1}$ acquired at a position to which the camera is moved.

The image processing unit may equally separate the initial image $I_t$, extract the feature points and track the extracted feature points in the next image $I_{t+1}$.

The set of feature points may be obtained by generating a set of feature points in descending order of index values thereof and computing the plane projective invariant.

In accordance with another aspect, there is provided a markerless augmented reality method using a projective invariant, the markerless augmented reality method including: photographing an object using a camera and acquiring an initial image $I_t$; equally separating the acquired initial image $I_t$ and extracting feature points; moving the camera and acquiring a next image $I_{t+1}$; tracking the extracted feature points in the next image $I_{t+1}$ and obtaining a set of feature points satisfying a plane projective invariant; and providing augmented reality based on the set of feature points satisfying the plane projective invariant.

The camera may acquire a plurality of images photographed at different positions.

The obtaining of the set of feature points satisfying the plane projective invariant may include computing the plane projective invariant using a world coordinate of a feature point expressed on an object plane and an image coordinate of a feature point expressed on an image plane in correspondence therewith, obtaining the set of feature points satisfying the plane projective invariant, and extracting a plane.

According to the markerless augmented reality system and method using the projective invariant, the feature points are tracked in two images photographed while varying the position of the camera, the set of feature points satisfying the plane projective invariant is obtained from the feature points, and augmented reality is provided based on the set of feature points. Accordingly, since the set of feature points satisfies the plane projective invariant even when the camera is moved and functions as a marker, a separate marker is unnecessary. In addition, since augmented reality is provided based on the set of feature points, a total computation amount is decreased and augmented reality is more efficiently provided.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings.

Figure 1:
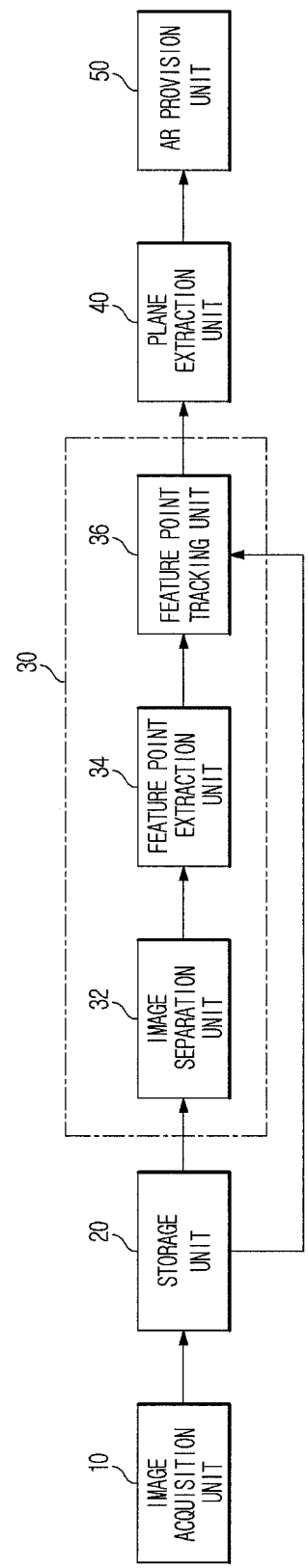
FIG. 1 is a control block diagram of a markerless augmented reality system using a projective invariant according to an embodiment.

FIG. 1 is a control block diagram of a markerless augmented reality system using a projective invariant according to an embodiment, which includes an image acquisition unit 10, a storage unit 20, an image processing unit 30, a plane extraction unit 40 and an Augmented Reality (AR) provision unit 50.

The image acquisition unit (device) 10 photographs or capture an image of an object using a camera and acquires image information of the object. The image device unit may be a camera. The camera may be provided in an Information Technology (IT) device, such as a game machine, a mobile phone or a smart phone, or an intelligent robot, and acquires the image information of the object using a single camera. However, it is not limited thereto.

The storage unit 20 is a memory to store the image information of the object acquired by the image acquisition unit 10. The storage unit 20 stores two images $I_t$ and $I_{t+1}$ which are photographed while changing the position of the camera. That is, an initial image $I_t$ acquired at a position before the camera is moved and a next image $I_{t+1}$ acquired at a predetermined time interval at a position to which the camera is moved are stored, such that two or more images are stored.

The image processing unit 30, which may be a computer, receives the image acquired using the image acquisition unit 10 from the storage unit 20, equally separates the image, and extracts features points. The image processing unit 30 includes an image separation unit 32 to equally separate the image acquired by the image acquisition unit 10, a feature point extraction unit 34 to extract feature points from the image separated by the image separation unit 32, and a feature point tracking unit 36 to track the feature points extracted by the feature point extraction unit 34.

The image separation unit 32 equally separates the initial image $I_t$ acquired at the position before the camera is moved.

The feature point extraction unit 34 extracts the feature points from the separated regions of the initial image $I_t$ acquired at the position before the camera is moved. The feature points which are not quantitatively varied according to a time and an observation angle when a constant point is selected are extracted from the separated regions of the initial image $I_t$, as the feature points. In a general image, a point which is not varied even when an observation angle is changed is searched for using a corner image or an image patch. In contrast, in one embodiment, indexing is performed according to the levels of specific values of feature points as follows.

$F_{ijn}$ indicates a feature point having an $n^{th}$ index value in a region (i, j) out of x and y pixel coordinates on a screen in which the image is separated.

The feature point tracking unit 36 tracks the feature points extracted from the regions equally separated from the initial image by the feature point extraction unit 34 in the next image generates a set of feature points in descending order of index values thereof, and sends the set to the plane extraction unit 40.

The plane extraction unit 40 extracts a plane from the feature points tracked by the feature point tracking unit 36 using a plane projective invariant. A projective invariant of the set of feature points in descending order of index values thereof is computed to obtain a set of feature points satisfying a plane projective invariant. The set of feature points satisfying the plane projective invariant is a plane.

In more detail, a plane projective invariant on an object plane and an image plane is defined by Equation 1 (see Korean Unexamined Patent Application Publication No. 2004-0044620).

$$I_1 = \frac{\det(p_5, p_2, p_3)}{\det(p_4, p_2, p_3)} \frac{\det(p_4, p_1, p_2)}{\det(p_5, p_1, p_2)} = \frac{\det(P_5, P_2, P_3)}{\det(P_4, P_2, P_3)} \frac{\det(P_4, P_1, P_2)}{\det(P_5, P_1, P_2)}$$

$$I_2 = \frac{\det(p_5, p_3, p_1)}{\det(p_4, p_3, p_1)} \frac{\det(p_4, p_1, p_2)}{\det(p_5, p_1, p_2)} = \frac{\det(P_5, P_3, P_1)}{\det(P_4, P_3, P_1)} \frac{\det(P_4, P_1, P_2)}{\det(P_5, P_1, P_2)}$$

Equation 1 where, $I_1$ and $I_2$ denote projective invariant descriptors of the acquired image, $P_i$ (i=1 to 5) denotes an object point, and $p_i$ (i=1 to 5) denotes an image point corresponding thereto.

In addition, det(•) used in Equation 1 is defined by Equation 2.

$$\det(p_1, p_2, p_3) = f\begin{bmatrix} x_1 & x_2 & x_3 \\ y_1 & y_2 & y_3 \\ 1 & 1 & 1 \end{bmatrix} \quad \text{Equation 2}$$

$$\det(P_1, P_2, P_3) = f\begin{bmatrix} X_1 & X_2 & X_3 \\ Y_1 & Y_2 & Y_3 \\ 1 & 1 & 1 \end{bmatrix} = 2^k(Area\, of\, \Delta P_1, P_2, P_3)$$

where, $\det(p_1, p_2, p_3)$ denotes an image coordinate of a feature point expressed on the image plane of the camera, and $\det(P_1, P_2, P_3)$ denotes a world coordinate of a feature point expressed on the object plane.

The projective invariant descriptors $I_1$ and $I_2$ defined by Equation 1 and Equation 2 are not varied even at the time of nonlinear conversion and the values thereof are not varied if the plane is satisfied even when the position of the camera is varied, that is, the shape of the image acquired by the image acquisition unit 10 is varied. Accordingly, the set of feature points satisfying the plane projective invariant is the plane and the AR may be provided based on the plane. When the set of feature points satisfying the plane projective invariant is obtained, a feature point having a small n value is searched for from the feature points $F_{ijn}$ indexed according to the levels of specific values.

The AR provision unit 50 provides the AR based on the set of feature points satisfying the plane projective invariant. Since the obtained set of feature points satisfies the projective invariant even when the camera is moved, the set of feature points functions as a marker when providing the AR.

Hereinafter, the operation and the effect of the markerless AR system and method using the projective invariant will be described.

Figure 2:
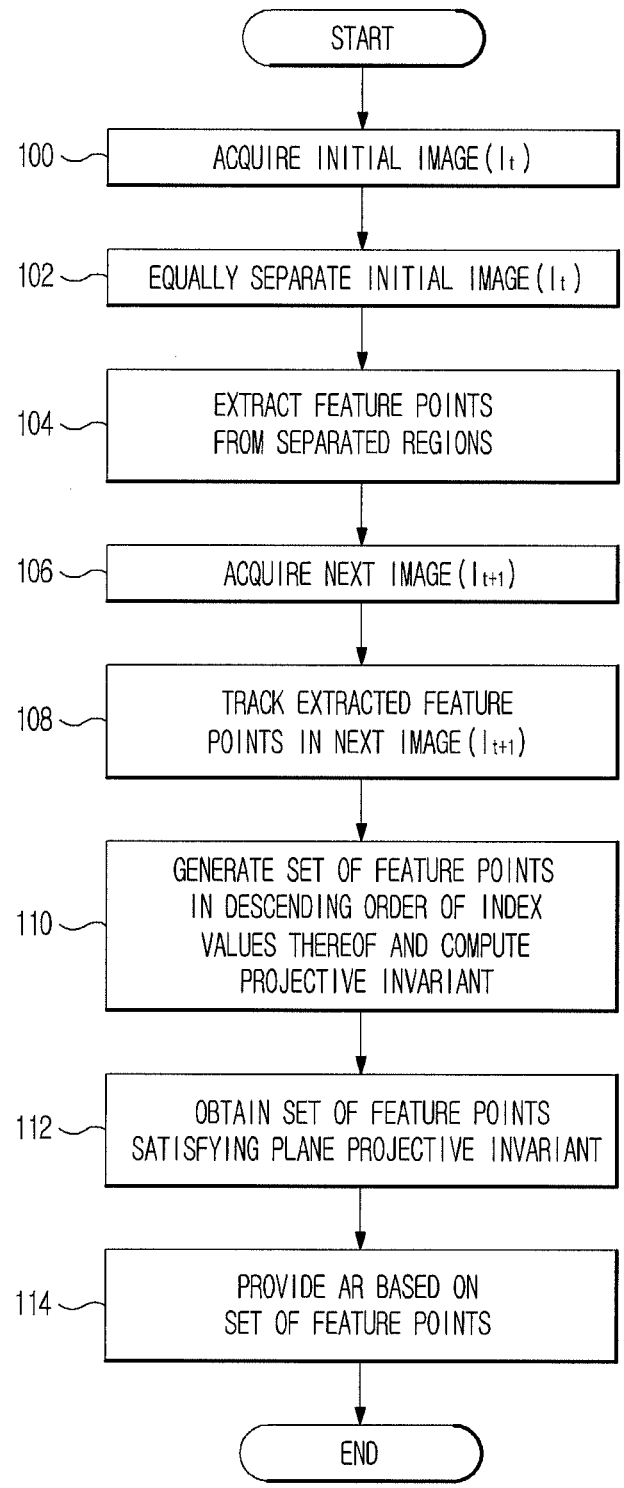
FIG. 2 is a flowchart illustrating a markerless augmented reality method using a projective invariant according to an embodiment.
Figure 3:
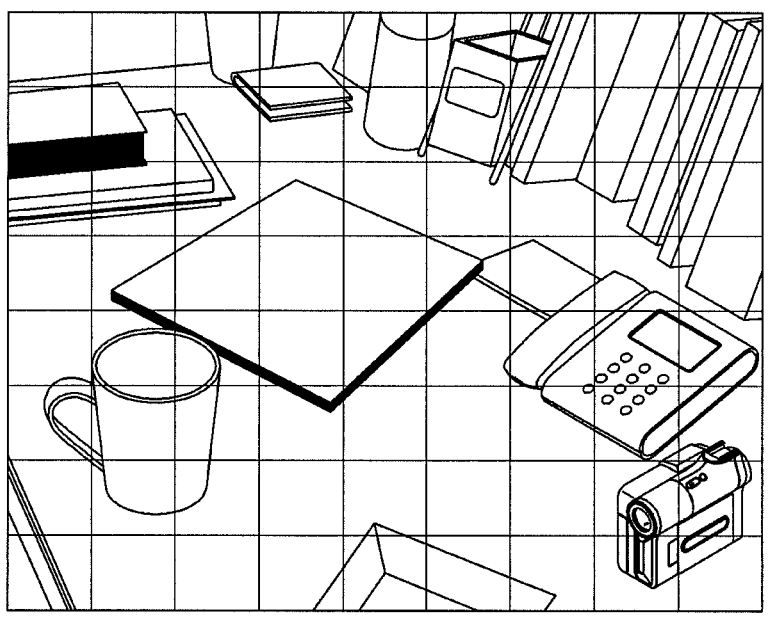
FIG. 3 is a image separation for feature point extraction according to an embodiment.
Figure 4:
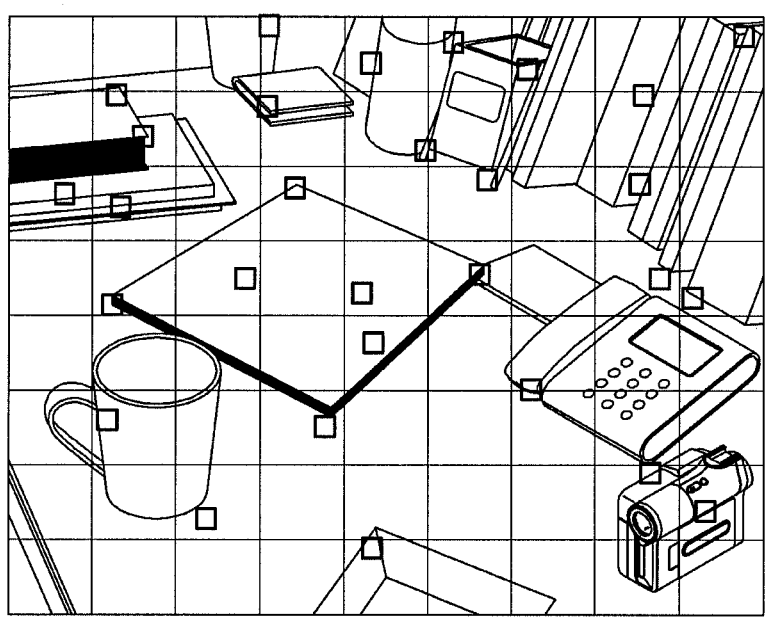
FIG. 4 is a feature point extraction according to an embodiment.
Figure 5:
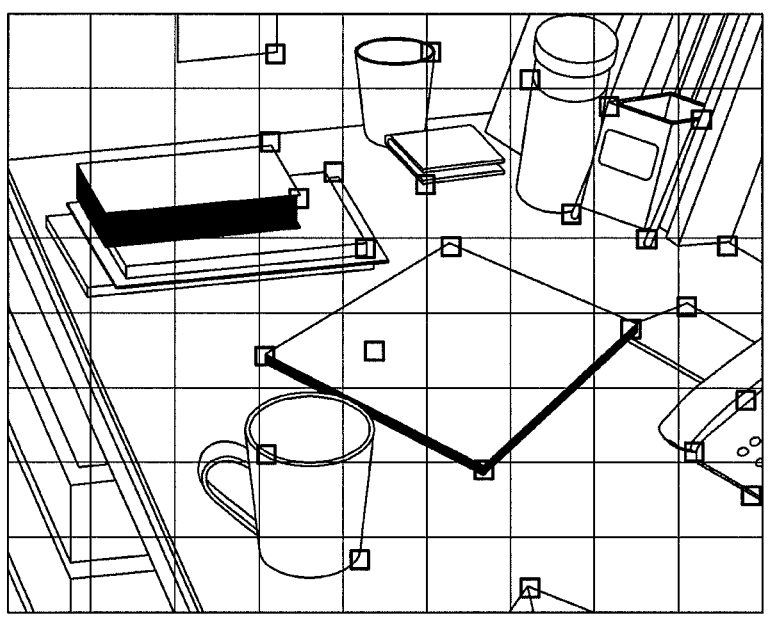
FIG. 5 is a feature point tracking according to an embodiment.
Figure 6:
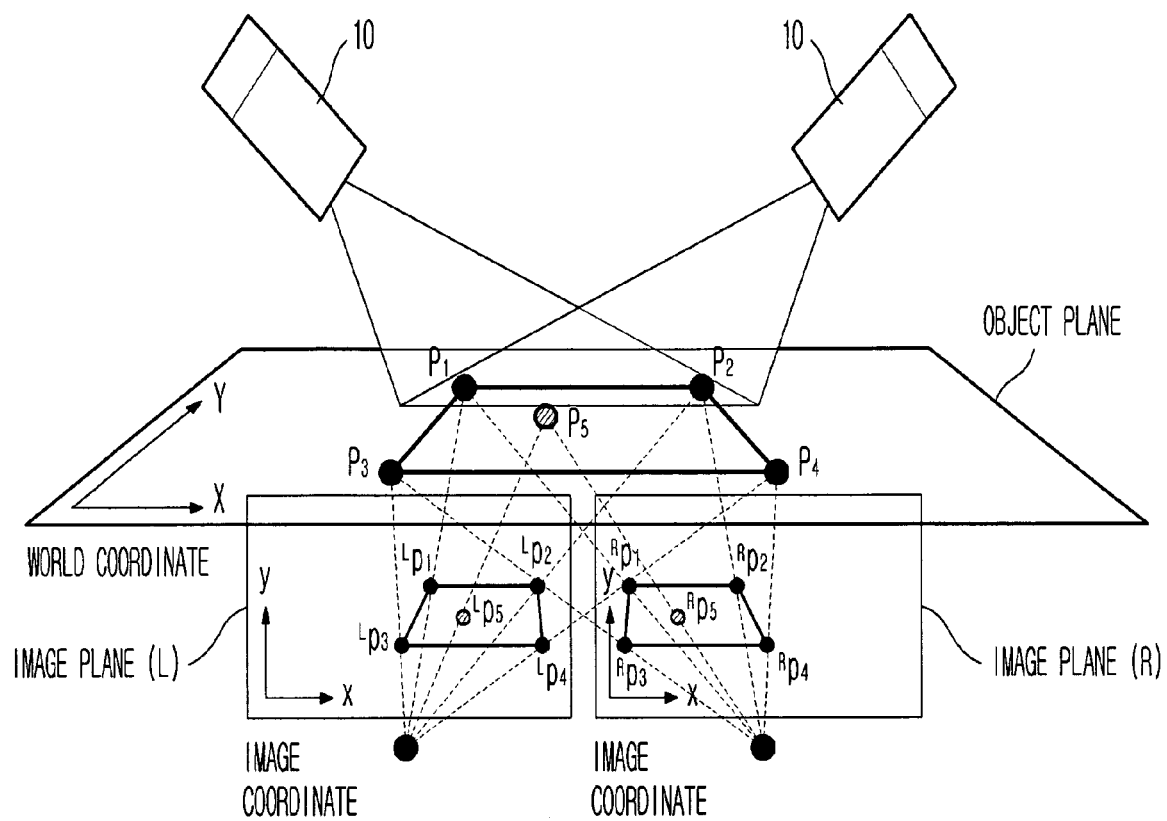
FIG. 6 is a view showing a coordinate system on an object plane and an image plane and a projection relationship according to an embodiment.
Figure 7:
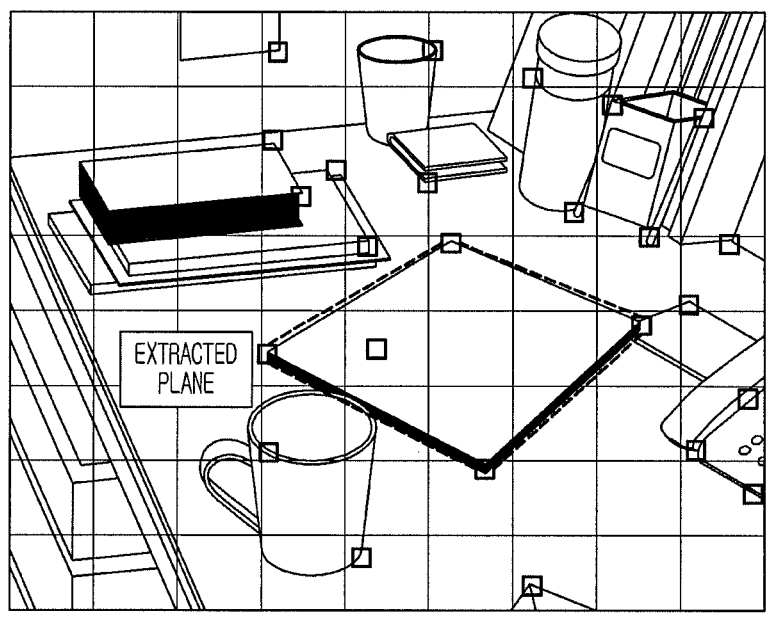
FIG. 7 is plane extraction according to an embodiment.
Figure 8:
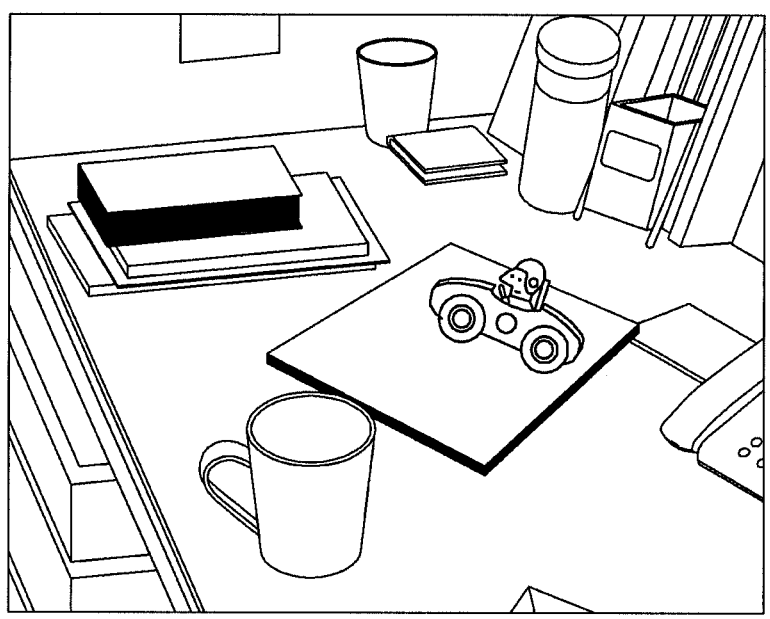
FIG. 8 is a conceptual diagram of provision of Augmented Reality (AG) according to an embodiment.

FIG. 2 is a flowchart illustrating a markerless augmented reality method using a projective invariant according to an embodiment, FIG. 3 is an image separation for feature point extraction according to an embodiment, FIG. 4 is a feature point extraction according to an embodiment, FIG. 5 is a feature point tracking according to an embodiment, FIG. 6 is a view showing a coordinate system on an object plane and an image plane and a projection relationship according to an embodiment, FIG. 7 is a plane extraction according to an embodiment, and FIG. 8 is a provision of AG according to an embodiment.

In FIG. 2, the image acquisition unit 10 provided in an IT device, such as a game machine, a mobile phone, or a smart phone, or an intelligent robot photographs an image of an object using a single camera and acquires image information of the object (100). The image information of the object obtained at this time is an initial image $I_t$ acquired at a position before the camera is moved and is stored in the storage unit 20.

The image separation unit 32 of the image processing unit 30 receives the initial image $I_t$ stored in the storage unit 20, equally separates the initial image $I_t$ acquired at the position before the camera is moved as shown in FIG. 3, and sends the image to the feature point extraction unit 34 (102).

Accordingly, the feature point extraction unit 34 of the image processing unit 30 extracts feature points □ from the regions equally separated from the initial image $I_t$, as shown in FIG. 4 (104). The feature points □ are indexed according to the levels of specific values as follows.

$F_{ijn}$ indicates a feature point having an $n^{th}$ index value in a region (i, j) out of x and y pixel coordinates on a screen in which the initial image $I_t$ is separated (see FIG. 4).

Thereafter, the camera is moved and the image information of the object is acquired by the image acquisition unit 10 again (106). The image information of the object acquired at this time is a next image $I_{t+1}$ acquired at a position to which the camera is moved and is stored in the storage unit 20. Accordingly, two pieces of image information which are acquired at a predetermined time interval while varying the position of the camera are stored in the storage unit 20.

The feature point tracking unit 36 of the image processing unit 30 tracks the feature points □ extracted from the region equally separated from the initial image $I_t$ in the next image $I_{t+1}$ acquired at the position to which the camera is moved, as shown in FIG. 5 (108).

A set of feature points is generated in descending order of index values thereof and is sent to the plane extraction unit 40.

Accordingly, the plane extraction unit 40 computes a projective invariant of the set of feature points in descending order of index values thereof and obtains a set of feature points satisfying a plane projective invariant (110 to 112). The process of obtaining the set of feature points satisfying the plane projective invariant will be described with reference to FIG. 6.

FIG. 6 is a view showing a coordinate system on an object plane and an image plane and a projection relationship according to an embodiment.

In FIG. 6, the image acquisition unit 10 photographs the image of the object at a left (L) position before the camera is moved and photographs the image of the object after the camera is moved to a right (R) position, such that two images are acquired while changing the position of the camera.

The image information of the object photographed at the left (L) position is expressed on the left (L) image plane by an image coordinate and the image information of the object photographed at the right (R) position is expressed on the right (R) image plane by an image coordinate.

In FIG. 6, $P_i$ (i=1 to 5) denotes an object point expressed on the object plane and $p_i$ (i=1 to 5) denotes an image point expressed on the image plane corresponding thereto.

As described above, Equation 1 defines the plane projective invariant on the object plane and the image plane.

$$I_1 = \frac{\det(p_5, p_2, p_3)\det(p_4, p_1, p_2)}{\det(p_4, p_2, p_3)\det(p_5, p_1, p_2)} \quad \text{Equation 1}$$

$$\frac{\det(P_5, P_2, P_3)\det(P_4, P_1, P_2)}{\det(P_4, P_2, P_3)\det(P_5, P_1, P_2)}$$

$$I_2 = \frac{\det(p_5, p_3, p_1)\det(p_4, p_1, p_2)}{\det(p_4, p_3, p_1)\det(p_5, p_1, p_2)}$$

$$\frac{\det(P_5, P_3, P_1)\det(P_4, P_1, P_2)}{\det(P_4, P_3, P_1)\det(P_5, P_1, P_2)}$$

where, $I_1$ and $I_2$ denote projective invariant descriptors of the acquired image, $P_i$ (i=1 to 5) denotes an object point, and $p_i$ (i=1 to 5) denotes an image point corresponding thereto.

The plane projective invariant is not varied if the plane is satisfied even when the position of the camera is varied. Accordingly, since a set of feature points satisfying the plane projective invariant is necessarily a plane, the plane is extracted using the projective invariant of the feature points □ as shown in FIG. 7.

Since the obtained set of feature points satisfies the projective invariant even when the camera is moved, the AR provision unit 50 provides the AR as shown in FIG. 8 based on the set of feature points satisfying the plane projective invariant (114).

Accordingly, since the set of feature points (plane) satisfies the projective invariant even when the camera is moved and functions as a marker, a separate marker is unnecessary when the AR is provided. In addition, since the AR is provided based on the set of feature points, a total computation amount may be decreased and the AR may be more efficiently provided.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A markerless augmented reality system receiving an image from an image device, the markerless augmented reality system comprising:
    an image processing unit to divide the image acquired by the image device into equal portions and to extract feature points from the divided image,
    wherein the image processing unit equally divides an initial image $I_t$ acquired at a position before the image device is moved and extracts the feature points, and
    wherein the image processing unit further includes a feature point tracking unit to track the extracted feature points in a next image $I_{t+1}$ acquired at a position to which the image device is moved;
    a plane extraction unit to extract a plane using a plane projective invariant of the tracked feature points; and
    an augmented reality provision unit to provide augmented reality based on the extracted plane.

2. The markerless augmented reality system according to claim 1, further comprises a storage unit to store two images taken by changing a position of the image device.

3. The markerless augmented reality system according to claim 1, wherein the image device is a single camera to acquire image information of an object at different positions.

4. The markerless augmented reality system according to claim 1, wherein the plane extraction unit obtains a set of feature points satisfying the plane projective invariant from the tracked feature points and extracts the plane.

5. The markerless augmented reality system according to claim 4, wherein the set of feature points is obtained by generating a set of feature points in descending order of index values thereof and computing the plane projective invariant.

6. The markerless augmented reality system according to claim 4, wherein the augmented reality provision unit provides the augmented reality based on the set of feature points satisfying the plane projective invariant.

7. A markerless augmented reality system receiving a plurality of images from an image device, the markerless augmented reality system comprising:
    an image processing unit to divide each of the plurality of images acquired by the image device into equal portions and to extract and track feature points from the plurality of divided images,
    wherein the plurality of images includes an initial image $I_t$ acquired at a position before the image device is moved and a next image $I_{t+1}$ acquired at a position to which the image device is moved, and
    wherein the image processing unit equally divides the initial image $I_t$, extracts the feature points, and tracks the extracted feature points in the next image $I_{t+1}$;
    a plane extraction unit to obtain a set of feature points satisfying a plane projective invariant from the tracked feature points and to extract a plane; and
    an augmented reality provision unit to provide augmented reality based on the set of feature points satisfying the plane projective invariant.

8. The markerless augmented reality system of claim 7, wherein the plurality of images are photographed at different positions by the image device.

9. The markerless augmented reality system of claim 7, further comprising:
    a storage unit to store the plurality of images.

10. The markerless augmented reality system according to claim 7, wherein the set of feature points is obtained by generating a set of feature points in descending order of index values thereof and computing the plane projective invariant.

11. A markerless augmented reality method using a projective invariant, the markerless augmented reality method comprising:
    photographing an object using an image device and acquiring an initial image $I_t$;
    dividing the acquired initial image $I_t$ into equal portions and extracting feature points from the divided image;
    moving the image device and acquiring a next image $I_{t+1}$;
    tracking the extracted feature points in the next image $I_{t+1}$, and obtaining a set of feature points from the tracked feature points satisfying a plane projective invariant; and
    providing augmented reality based on the set of feature points satisfying the plane projective invariant.

12. The markerless augmented reality method according to claim 11, wherein the image device acquires a plurality of images photographed at different positions.

13. The markerless augmented reality method according to claim 11, wherein the set of feature points is obtained by generating a set of feature points in descending order of index values thereof and computing the plane projective invariant.

14. The markerless augmented reality method according to claim 11, wherein the obtaining of the set of feature points satisfying the plane projective invariant includes computing the plane projective invariant using a world coordinate of a feature point expressed on an object plane and an image coordinate of a feature point expressed on an image plane in correspondence therewith, obtaining the set of feature points satisfying the plane projective invariant, and extracting a plane.

15. The markerless augmented reality method according to claim 11, wherein the image device is a camera.

* * * * *

UNITED STATES PATENT AND TRADEMARK OFFICE
CERTIFICATE OF CORRECTION

PATENT NO. : 8,791,960 B2  
APPLICATION NO. : 12/905649  
DATED : July 29, 2014  
INVENTOR(S) : Suk June Yoon et al.

Page 1 of 1

It is certified that error appears in the above-identified patent and that said Letters Patent is hereby corrected as shown below:

On the Title Pages

Column 1, Item [75] (Inventors), Line 4, Delete "Angyang" and insert -- Anyang --, therefor.

Column 2, Item [56] (Other Publications), Line 6, Delete "partterns;"" and insert -- patterns;" --, therefor.

Column 2, Item [57] (Abstract), Line 5, After "image" insert -- acquisition --.

Column 2, Item [57] (Abstract), Line 10, After "image" insert -- acquisition --.

In the Claims

Column 8, Line 32, In Claim 11, delete "$I_{t+1}$," and insert -- $I_{t+1}$ --, therefor.

Signed and Sealed this  
Fourth Day of November, 2014

Michelle K. Lee  
*Deputy Director of the United States Patent and Trademark Office*